May 23, 1950 — M. J. ZUCROW — 2,508,590
JET MOTOR WITH COOLING SYSTEM
Original Filed July 14, 1944
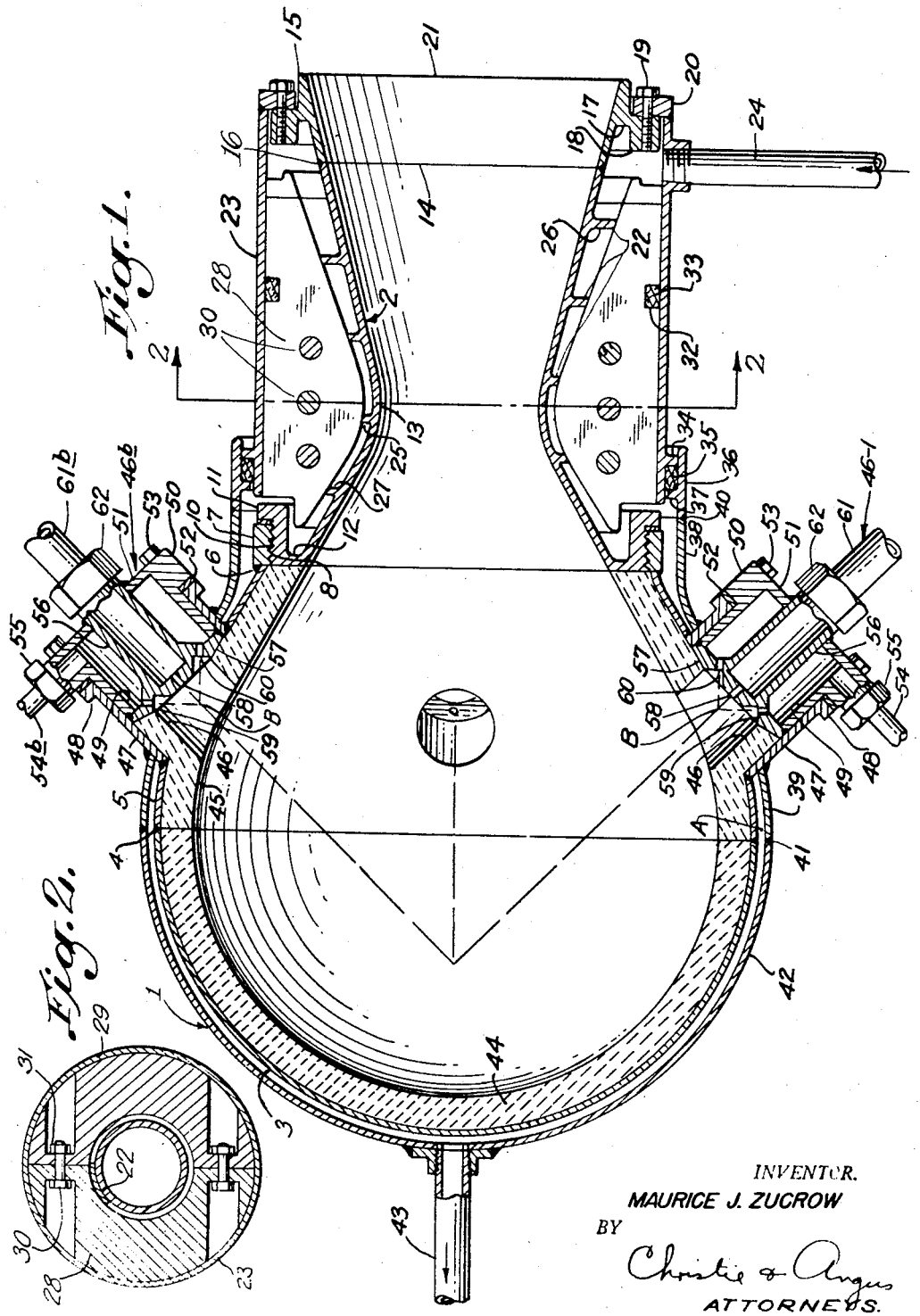
INVENTOR.
MAURICE J. ZUCROW
BY Christie & Angus
ATTORNEYS.

Patented May 23, 1950

2,508,590

UNITED STATES PATENT OFFICE 2,508,590

JET MOTOR WITH COOLING SYSTEM

Maurice J. Zucrow, Altadena, Calif., assignor to Aerojet Engineering Corporation, Pasadena, Calif., a corporation of Delaware Original application July 14, 1944, Serial No. 544,868. Divided and this application July 16, 1945, Serial No. 605,305

10 Claims. (Cl. 60—35.6)

This invention relates to jet propulsion motors and methods for operating the same and has for its object the improvement of the operating performance of such motors.

This application is a division of my copending application Serial No. 544,868, filed July 14, 1944.

Jet propulsion motors have heretofore been operated by burning fuel in a combustion chamber and causing the ensuing products of combustion to be ejected through an exhaust nozzle to create the propulsion force.

Good performance has been obtained by injecting two propellant liquids into the combustion chamber, one a fuel and the other an oxidizer for the fuel; for example, aniline has been used as a fuel and red fuming nitric acid as an oxidizer. These two liquids have been injected separately into the combustion chamber and caused to impinge upon each other, whereupon spontaneous combustion takes place, liberating a large amount of gases which escape through the exhaust nozzle in the form of a jet.

The combustion in the combustion chamber develops great heat, and the hot gases passing through the nozzle heat up the nozzle considerably. It is desired to provide coolant for the nozzle and the chamber and also to take care of expansions of the parts at the elevated temperatures.

In accordance with the present invention, there is provided means for passing a cooling fluid along the outside wall of the nozzle. Preferably the path of the coolant is in spiral convolutions around the nozzle wall.

A related feature is the provision of a space or passageway for cooling fluid flow around the combustion chamber.

A related feature is the provision of a passageway communicating from the coolant space around the chamber to the spiral convolutions around the nozzle.

A further feature of the invention is the provision of an annular element around the nozzle and forming a boundary for the spiral convolution, provision being made for expansion of the parts due to heat. According to a preferred construction, this provision comprises an outer casing around the combustion chamber joined to an outer casing around the annular element with provision for relative movement between the annular element and the last-named casing.

My invention will be better understood from the following description when taken in conjunction with the drawing in which:

Fig. 1 is an elevational view in cross section of a jet propulsion motor embodying my invention; and Fig. 2 is a cross sectional view at line 2—2 of Fig. 1.

Similar numerals refer to similar parts in the views.

The motor shown in Fig. 1 comprises a combustion chamber formed by the wall 1 in the shape of a portion of a sphere, and an exhaust nozzle 2 protruding from the chamber. The combustion chamber may be made of a suitable metal such as steel and may conveniently be of two parts, as shown, there being a hemispherical portion 3 which is welded to the other portion 5 at 4. The portion 5 is somewhat elongated and contains a flange 7 welded thereto at 6. Flange 7 contains internal threads 8 into which the exhaust nozzle 2 is screwed. For this purpose the exhaust nozzle 2 has a collar 10 provided with threads and a shoulder flange 11, the shoulder flange 11 being recessed as shown at 12. The wall of the exhaust nozzle 2 contracts toward a constricted portion 13 from the recess 12, and from the constricted portion 13 the nozzle flares outwardly to an enlarged opening 14. Another flange 15 welded at 16 to the enlarged portion 14 continues substantially the general outline of the exhaust nozzle forming a recess at 17 and a thickened section 18 which provides the necessary material for the threads of the screws 19. The flange 15 is machined to receive bolt ring 20 and machined to complete the general outline of the exhaust nozzle at 21.

In Figs. 1 and 2 the exhaust nozzle is shown as being surrounded by a jacket 23 arranged to provide a fluid flow spirally from an inlet 24 for cooling liquid at the extreme end of the exhaust nozzle toward a chamber A around the combustion chamber. A spiral member 22 formed integrally with the wall 2 of the exhaust nozzle, or welded to it, forms this spiral passage. At the front end 21 of the exhaust nozzle the area of the fluid passage is larger than at the throat 13 of the exhaust nozzle. The construction accomplishes this by the fact that at the throat 13 the height of the convolutions of the spiral, for example, convolution 25 is less away from the throat than convolution 26 on one side and 27 on the other. A pair of solid members 28 and 29 are placed around the spiral at the nozzle, the two halves being bolted together by bolts 30, (Fig. 2) which are secured in place by nuts 31, (Fig. 2). The inner curved surfaces of members 28 and 29 fit snugly against the edges of the spiral so that the fluid passageway at the throat 13 (Fig. 1) near 25 has less area than near the more remote convolutions 26 and 27. The outer cylindrical surfaces of members 28 and 29 match the inner surface of the jacket 23. One or a plurality of grooves 32 are machined around members 28 and 29 and into each groove an O ring 33 is snapped providing a fluid-tight contact between members 28 and 29 and the tubular jacket 23. The coolant inlet 24 communicates with the spiral convolution which is nearest to the end of the exhaust nozzle 2. The tubular jacket 23 is welded to the bolt ring 20. By inserting screws 19 through the bolt ring 20 and screwing them into the flange 15 the exhaust nozzle is thereby removably fastened to the tubular member 23.

The tubular jacket is provided with a protruding ring 34 which acts as a retainer on one side for another O ring 35. The O ring 35 fits between the tubular jacket 23 and a tubular member 36 which surrounds jacket 23. Tubular member 36 contains another ring 37 protruding towards the center of member 36. Ring 37 acts as another retainer for the O ring 35. A tubular member 38 suitably welded or attached to member 36, flares outwardly to form a spherical jacket 39 conforming with and surrounding the member 5 of the combustion chamber. The space between the chamber and outer jacket 39 is the chamber A, adapted to receive and contain the liquid received from the spiral convolutions 22. Another hemispherical member 42 is welded at 41 to the elongated member 39. Continuation of chamber A is provided between the members 3 and 42.

In the extreme portion of the hemispherical member 42 there is provided an outlet 43 for the coolant liquid. A refractory liner 44 is placed against the inner wall of the hemispherical portion 3 of the combustion chamber and held in place by the inserted refractory liner 45 which is held in place by collar 10 of the exhaust nozzle.

The refractory liners may be of any suitable refractory material, for example, tungsten, tungsten carbide, silicon carbide, boron carbide, calcium oxalate, carbon (graphite), magnesium oxide, molybdenum carbide, zirconium carbide, zirconium oxide or any other standard refractories such as mullite, transite, mixture of carbon and asbestos, or other like substances.

A plurality of propellant injectors are provided, two of which are shown in detail. For a simplified description I select the upper injector 46b shown in the drawing. At a portion of the member 39 a tubular member 47 having a rectangular flange 48 is welded thereto. The tubular member 47 projects through chamber A into the hemispherical member 5 to which it is also welded.

Another tubular member 49 having in one end a wall 51 and a rectangular flange 50 is inserted into the tubular member 47. Flange 50 of the tubular member 49 is seated on a gasket 52 and secured to flange 48 of the tubular member 47 by a plurality of screws 53. A flared nipple (not shown) is provided in the left hand side of flange 48 to which a conduit 54b may be attached in the conventional manner and secured thereto with nut 55. A tubular member 56 having an enlarged flat disc 57 on one end is welded in its extreme cylindrical portion to the tubular member 49. Disc 57 has a concentric orifice 58 and an annularly machined groove forming a conical surface 59 having two or more orifices 60 therein. The outflow from these orifices impinge each other at point B. The other end of member 56 is flared (not shown) having a threaded portion below the flare for attaching a conduit 61b securing it with nut 62.

It can be recognized in accordance with my invention that I have provided a liquid operated jet motor in which the heat generated by the reaction within the combustion chamber is absorbed in part through a cooling jacket in conjunction with a plurality of liners. This greatly extends the life of the motor. I have further provided for expansion of all metal parts in my novel motor, which necessarily would occur when these parts become heated, and which if not compensated in some manner would soon distort and rupture the motor.

I claim:

1. In a jet thrust motor, the combination comprising a combustion chamber having a flange, said flange having internal threads for receiving the threaded collar of a replaceable exhaust nozzle, said exhaust nozzle having external spiral convolutions, a convex member surrounding said convolutions and having a cylindrical outer surface, a casing enclosing said outer surface, said casing having a flexible ring for establishing a liquid-tight joint between said casing and cylindrical outer surface of said convex member, said casing having a protruding ring member for locating a second flexible ring, a tubular member surrounding said protruding ring member and the second flexible ring member, said tubular member having an internal ring member for securing said second flexible ring member, said tubular member being in contact with another casing enveloping said combustion chamber, said casing and said combustion chamber being arranged in spaced relation as to provide a space for a coolant fluid, so that said coolant may flow through said convolutions and said space, thereby cooling said combustion chamber and said exhaust nozzle.

2. In a jet thrust motor the combination according to claim 1 in which a ceramic liner covers the inner wall of said combustion chamber to protect the wall from the heat of combustion.

3. In combination with a jet motor, a combustion chamber having an inner wall and an outer wall forming between them a space for the passage of cooling fluid, an exhaust nozzle attached to the outlet from the chamber, said nozzle having an inner wall and an outer wall forming between them a second space for the passage of cooling fluid, means for attaching the nozzle to the chamber so that the cooling fluid spaces communicate with each other, said means comprising fastening means for fastening one wall of the chamber to the corresponding wall of the nozzle, and means for placing the other wall of the chamber in sliding relation to the other wall of the nozzle, sealing means between the sliding walls whereby the sliding of the walls takes care of expansion due to temperature changes without permitting leakage of the fluid.

4. In combination with a jet motor having a combustion chamber provided with an inner wall and an outer wall forming between them a space for the passage of cooling fluid, means for attaching to the outlet from the chamber an exhaust nozzle having an inner wall and an outer wall forming between them a second space for the passage of cooling fluid, said means comprising a threaded member on the inner wall of the chamber and a threaded member on the inner wall of the nozzle adapted to engage the threaded member of the chamber, the outer walls of the chamber and nozzle being arranged to form a sliding fit one within the other, and a liquid seal between the last two mentioned walls, whereby the cooling fluid spaces of the nozzle and the combustion chamber communicates with each other.

5. Apparatus according to claim 4 in which the outer wall of the nozzle is attached to the inner wall of the nozzle at a position remote from the combustion chamber.

6. Apparatus according to claim 4 in which the cooling space of the nozzle is spiral, one end of the spiral having an inlet for the cooling fluid and the other end of the spiral communicating with the cooling fluid space around the chamber.

7. In a jet thrust motor, the combination comprising a combustion chamber and an exhaust nozzle, the outer wall of said nozzle having spiral convolutions, a convex member surrounding said convolutions and having a cylindrical outer surface, a casing enveloping said outer surface, a second casing enveloping said combustion chamber, means for engaging said first mentioned casing with said second casing, a space between the second casing and the outer wall of the combustion chamber for fluid flow and a passageway from said space to the inside of the first casing and communicating with said convolutions whereby the coolant fluid can flow through said convolutions and around said combustion chamber.

8. In a jet thrust motor the combination comprising a combustion chamber, an exhaust nozzle, the outer wall of said exhaust nozzle having spiral convolutions, a convex member surrounding said convolutions and having a cylindrical outer surface, a casing enveloping said outer surface, said casing having means for establishing a liquid tight joint between said casing and said cylindrical outer surface of said convex member, said casing having a protruding ring member, a flexible ring located by said protruding ring member, a tubular member surrounding said protruding ring member and the said flexible ring, said tubular member having an internal ring member for securing said flexible ring, a second casing enveloping said combustion chamber and in contact with said tubular member, said last mentioned casing and said combustion chamber being arranged in such a manner as to provide a space for a coolant fluid between the last-mentioned casing and the combustion chamber, said space being in communication with said convolutions so that said coolant may flow through said convolutions and said space.

9. In a jet thrust motor the combination comprising a combustion chamber, an exhaust nozzle, the outer wall of said exhaust nozzle having spiral convolutions, a convex member surrounding said convolutions and having a cylindrical outer surface, a casing enveloping said outer surface, said casing having means for establishing a liquid tight joint between said casing and said cylindrical outer surface of said convex member, said casing having a protruding ring member, a flexible ring located by said protruding ring, a tubular member surrounding said protruding ring member and the said flexible ring, said tubular member having an internal ring member for securing said flexible ring, a second casing in contact with said tubular member and enveloping said combustion chamber, an outlet port disposed at the end of said combustion chamber opposite said nozzle so that said coolant may flow through said convolutions and said space and may be withdrawn from said outlet port.

10. In a jet thrust motor the combination according to claim 7, in which a ceramic liner covers the inner wall of said combustion chamber to protect the wall from the heat of combustion.

MAURICE J. ZUCROW.

REFERENCES CITED

The following references are of record in the file of this patent:

UNITED STATES PATENTS

| Number | Name | Date |
|---|---|---|
| 769,379 | Herold | Sept. 6, 1904 |
| 897,503 | Wedekind | Sept. 1, 1908 |
| 919,895 | Lemale | Apr. 27, 1909 |
| 1,856,552 | Hadamik et al. | May 3, 1932 |
| 1,954,454 | McFarland | Apr. 10, 1934 |
| 2,078,956 | Lysholm | May 4, 1937 |
| 2,145,507 | Denoix | Jan. 31, 1939 |
| 2,272,194 | Frances | Feb. 10, 1942 |

FOREIGN PATENTS

| Number | Country | Date |
|---|---|---|
| 148,823 | Great Britain | Feb. 9, 1922 |

OTHER REFERENCES

Ser. No. 215,792, Neugebauer et al. (A. P. C.), published April 27, 1943.